United States Patent
Dean

(10) Patent No.: US 6,923,538 B2
(45) Date of Patent: *Aug. 2, 2005

(54) METHOD FOR CAST MOULDING CONTACT LENSES WITH A ROUNDED EDGE FORM

(75) Inventor: Gregg A. Dean, St. Denys (GB)

(73) Assignee: CooperVision, Inc., Fairport, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 10/171,927

(22) Filed: Jun. 14, 2002

(65) Prior Publication Data

US 2002/0196411 A1 Dec. 26, 2002

Related U.S. Application Data

(63) Continuation of application No. 09/611,768, filed on Jul. 6, 2000, now Pat. No. 6,431,706.

(51) Int. Cl.[7] .................................................. G02C 7/04
(52) U.S. Cl. .................... 351/160 H; 351/177
(58) Field of Search .................... 351/160 H, 160 R, 351/161, 162, 177

(56) References Cited

U.S. PATENT DOCUMENTS

| | | |
|---|---|---|
| 3,761,208 A | 9/1973 | Boudet et al. |
| 4,138,086 A | 2/1979 | Mizutani et al. |
| 4,209,289 A | 6/1980 | Newcomb et al. |
| 4,578,230 A | 3/1986 | Neefe |
| 4,696,974 A | 9/1987 | Sulc et al. |
| 5,252,056 A | 10/1993 | Horner et al. |
| 5,611,970 A | 3/1997 | Apollonio et al. |
| 5,951,934 A | 9/1999 | Wickes et al. |
| 6,431,706 B1 * | 8/2002 | Dean ........................ 351/177 |

FOREIGN PATENT DOCUMENTS

| | | |
|---|---|---|
| EP | 0 383 425 | 8/1990 |
| WO | WO 01/42001 | 6/2001 |

* cited by examiner

*Primary Examiner*—Scott J. Sugarman
(74) *Attorney, Agent, or Firm*—Stout, Uxa, Buyan & Mullins, LLP; Frank J. Uxa

(57) ABSTRACT

Methods for producing contact lenses include providing a back surface tool having a surface generally corresponding to a desired contact lens surface and a convex curve along an outer radius thereof, positioning the tool in a molding apparatus, introducing a moldable material into the molding apparatus to form a first mold section having a negative impression of the surface of the tool, assembling the first mold section with a second mold section to form a lens shaped cavity therebetween and forming a contact lens member in the lens shaped cavity of the assembled mold sections. Molds useful in producing contact lenses, tools useful in making mold sections for molding contact lenses and contact lenses having rounded edge surfaces are also provided.

18 Claims, 4 Drawing Sheets

METHOD FOR CAST MOULDING CONTACT LENSES WITH A ROUNDED EDGE FORM

RELATED APPLICATION

This is a continuation of application Ser. No. 09/611,768, filed Jul. 6, 2000, now U.S. Pat. No. 6,431,706 the disclosure of which is incorporated in its entirety herein by reference.

BACKGROUND OF THE INVENTION

The present invention generally relates to the manufacture of contact lenses and more specifically relates to methods for cast molding contact lens with a molded edge that requires no dedicated post-processing steps.

Contact lenses have historically been made by machining a lens material, in button (or block) form on front and back surfaces thereof to produce an unfinished lens product having the required fit, or "base curve", and visual correction, to compensate for one or more refractive abnormalities of the eye. Such refractive abnormalities may include myopia (nearsightedness), hypermetropia (farsightedness), astigmatism, presbyopia and the like. Using conventional machining technology, the optic faces of the unfinished lens require polishing in order to remove rings, known as "turning rings", on the unfinished lens that have been created by the machining process. Typically the edge of the lens is also polished to produce smooth edge geometry, or profile, in order to maximize wearer comfort and prevent injury to the eye. The edge polishing step is particularly important in the manufacture of "hard" lenses, in which the lens material is relatively rigid and inflexible and even small defects on the edge can cause irritation in the wearers' eye.

The machining process described above, being very labor intensive, has been widely replaced by cast molding of the lens. In conventional cast molding techniques, front and back surface mold halves are made for the required lens prescription. Each mold section is produced by injection molding techniques. A mold insert tool, for example made of metal, ceramic or the like, is provided and secured or fixed in an injection molding machine. A mold section, or mold half, is then produced having the contour of the insert. Thus, the mold section may include a negative impression of, or a contour which corresponds to, the desired lens front or back surface.

The two mold halves are assembled and lens material, for example a curable, mixture of polymerizable monomers, is introduced between the assembled mold halves. After the cast molding steps, subsequent processing steps are employed, which may include for example, curing, demolding, and hydration (in the case of hydrogel lenses). In addition, edge polishing operations are often performed to smooth the edge profile of the lens.

A method of cast molding contact lenses, particularly toric contact lenses, is described in Appollonio, et al, U.S. Pat. No. 5,611,970 which is incorporated in its entirety herein by reference.

Methods for fully cast molding contact lenses have been developed. Fully cast molded lenses are lenses in which all surfaces, front, back and edge of the lens are molded as part of a mold pair and no post processing polishing or machining operations are performed to yield the final lens product.

Unfortunately, although fully molded lenses provide an inexpensive and flexible alternative to machined and polished cast molded lenses, fully molded lenses are sometimes uncomfortable for the wearer and may even harm the eye, particularly after long term use.

It has been shown that the form and size of the edge of a contact lens have significant effects on wearer comfort and conjunctival health. It is conventional that a fully molded lens will have a lens edge form which is "chiseled", or "pointed" in some way, and is not representative of a polished edge or an edge which had been historically manufactured to improve wearer comfort.

Wearers of conventional fully molded lenses have been known to suffer from eye irritation and reduction in "end of day comfort" of the eye. Moreover, long term wearers have been observed, with the use of a fluorescein dye, to have 'scuff' marks formed on the sclera, the scuff marks being caused by interaction between the lens and eye. To achieve a more desirable edge geometry and provide a more comfortable lens, some lens manufacturers will apply additional, separate, post processing steps such as edge polishing, in otherwise fully molded lenses. Polishing the cast molded lens will generally remove the chiseled or pointed edge profile that is conventionally produced by cast molding. Understandably, however, the additional manufacturing step will tend to increase the cost of the final lens product.

It would be highly advantageous to provide a method by which a lens could be cast molded, the resulting lens having a desirable, substantially smooth or rounded edge geometry, without the need for post processing polishing steps.

SUMMARY OF THE INVENTION

Accordingly, a method is provided for fully cast molding contact lenses having rounded edge surfaces. Advantageously, by implementation of the present invention, lenses can be created with an edge form providing enhanced comfort and/or safety without the need for costly and time consuming post formation processing steps.

Generally, methods for producing contact lenses, in accordance with the present invention comprise providing a tooling insert or tool, for example, a back surface tool, having a surface generally corresponding to a desired contact lens surface and a convex curve along an outer or peripheral radius thereof. The tool is used to form a mold section which generally defines a negative impression of a surface of the final lens product. For example, the tool is positioned in a molding apparatus, such as a molding apparatus of conventional design. A moldable composition, such as a polymeric material or a precursor composition of a polymeric material, is introduced into the molding apparatus and subjected to conditions effective to form a mold section having a negative impression of the surface of the tool. The mold section formed by the tool is a back surface mold section. In other words, the surface of the tool generally corresponds to a face, preferably the posterior face, of the contact lens to be formed. Thus, the tool may be a back surface tool generally defining the base curve of the contact lens product. As will be described in more detail hereinafter, the convex curve of the tool, when used to form a back surface mold section, provides a contact lens having the desired rounded edge form without the need for post formation processing steps.

For example, to form the rounded edge contact lens, the back surface tool having the convex curve along the outer radius thereof is positioned in a molding apparatus, for example, a conventional, injection molding apparatus. A first mold section having a negative impression of the surface of the tool is formed. This first mold section is assembled with a second mold section. The second mold section may be made in a conventional manner and preferably generally defines a negative impression of a front, or anterior, surface of the contact lens to be produced. The assembled first and second mold sections form a lens-shaped cavity, and the method includes forming a contact lens member in the lens shaped cavity of the assembled mold sections. Upon demolding or removal from the mold sections, a fully molded, contact lens member having a rounded edge form or surface is obtained.

The demolded contact lens member may be the final contact lens. However, the demolded contact lens member may be hydrated or further hydrated to form the final contact lens with a rounded edge surface. One important advantage of the present invention is that the present contact lenses preferably do not require post-formation (after being molded) processing to alter the rounded configuration of the outer peripheral edge surface of the contact lens member or contact lens. Post-formation processing such as demolding, hydration, sterilization, packaging and the like of the contact lens or contact lens member does not alter this rounded edge surface configuration.

The portion of the back surface tool that forms the lens periphery is convex in form, preferably having a radius of at least about 0.05 mm or larger. Correspondingly, the first mold section formed by the tooling insert has a concave outer edge surface. It will be appreciated by those skilled in the art that both the tooling insert and the mold section formed thereby, in accordance with the present invention, are significantly different in form from conventional back surface tooling inserts and conventionally produced back surface mold sections.

Preferably, in accordance with the present invention, a junction angle formed between the assembled first and second mold sections, on the lens side of the lens-shaped cavity, is at least about 100 degrees, more preferably in the range of about 100 degrees to about 170 degrees.

The present invention further provides a tool, preferably a back surface tool, useful for cast molding a contact lens, for example, a contact lens having a rounded peripheral edge surface in making a mold section. In accordance with this embodiment of the invention, the tool generally comprises an insert adapted to be placed in a molding apparatus in forming a first mold section, specifically a back surface mold section, having a negative impression of a surface of the tool. To form the rounded edge surface of the final lens product, the surface of the tool includes a first surface portion in the general shape of a lens face, preferably a posterior lens face, of a contact lens, and a second surface portion defining a convex curved outer peripheral edge surface of the insert. The second surface portion may be defined by a continuous curve with a radius of curvature of about 0.05 mm. Alternatively, the second surface portion may be defined by a series of small flats, or a combination of small flats and curves, which approximate a convexly curved surface.

In another aspect of the present invention, a mold useful in producing, e.g., cast molding, a contact lens, preferably, a contact lens with a rounded edge surface, is provided. The mold generally comprises a first mold section having a surface in a general shape of a negative of a lens face, preferably a posterior lens face, of a contact lens to be cast molded using the mold and a concave outer edge surface, and a second mold section having a surface in a general shape of a negative of an opposing lens face, preferably an anterior lens face of the contact lens to be cast molded using the mold. The first mold section and the second mold section are adapted to be assembled together, for example, in a conventional manner, to define a cavity, in which is formed a fully cast molded, rounded edge contact lens or contact lens member in accordance with the present invention.

In a further aspect of the present invention, fully cast molded contact lenses having rounded peripheral edge surfaces are provided. Such contact lens may be produced using the methods, tools and molds described herein.

It should be appreciated that each and every feature described herein, and each and every combination of two or more of such features, is included within the scope of the present invention provided that the features included in such a combination are not mutually inconsistent.

BRIEF DESCRIPTION OF THE DRAWINGS

The advantages of the present invention will be more readily understood with reference to the following description when considered in conjunction with the appended drawings of which.

DESCRIPTION OF THE PRESENT INVENTION

New methods for cast molding contact lenses have been discovered. The present invention provides the ease of cast molding with the ability to produce a substantially smooth, rounded edge forms or surfaces without the need for costly post-processing steps.

Conventional cast molding techniques for manufacturing fully cast molded lenses produce a lens with a sharp, pointed edge profile. As mentioned hereinabove, the sharp edge is sometimes made to be smoothed or rounded by means of a polishing step that is separate from the cast molding process.

Figure 1A:
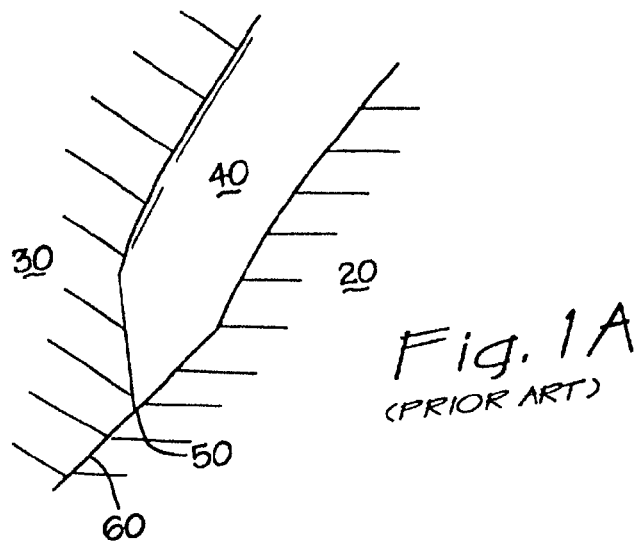
FIGS. 1A and 1B are cross sectional views of conventional moldings for forming conventional contact lenses.

Turning now to FIG. 1A, two conventional mold halves 20, 30 which are sometimes hereinafter referred to as "casting cups", are shown in cross-section, as assembled together during conventional cast molding techniques. Lens material, for example a curable, mixture of polymerizable monomers, is introduced into a lens-shaped cavity 40 defined between the casting cups 20, 30 to form the fully cast molded lens product.

Any suitable lens material or lens material precursor may be employed in forming the present contact lenses and lens bodies in accordance with the present invention. The final contact lens and lens body may be rigid, rigid gas permeable, soft, and/or hydrophilic. Preferably, the contact lens or lens body, for example, hydrated for use, is soft and in the form of a hydrogel and/or a high oxygen permeability, that is a high Dk, material. One particularly useful class of lens materials are hydrophilic silicone-containing materials. Such hydrophilic silicone-containing materials are high Dk materials and may have a number of the advantageous properties of both silicone polymeric materials, for example, crosslinked silicone polymeric materials, and hydrogel-forming polymeric materials. Contact lenses made of hydrophilic silicone-containing materials often have a relatively high modulus and are very advantageous, for example, provide reduced risk of eye irritation, when structured to include a rounded peripheral edge form or surface, in accordance with the present invention.

In the example shown in FIG. 1, one casting cup 20 generally defines a negative impression of the lens back or posterior surface (base curve) and one casting cup 30 generally defines a negative impression of the lens front or anterior surface.

In commercially available lenses, the point at which the two mold halves meet is usually chosen as the outer periphery of the finished lens. As shown in FIG. 1A, the mold cups 20, 30 meet at a point 50. This point 50 generally defines the molded lens edge. The edge of a fully molded lens conventionally represents the split line 60 between the male and female casting cups 20, 30.

Figure 1B:
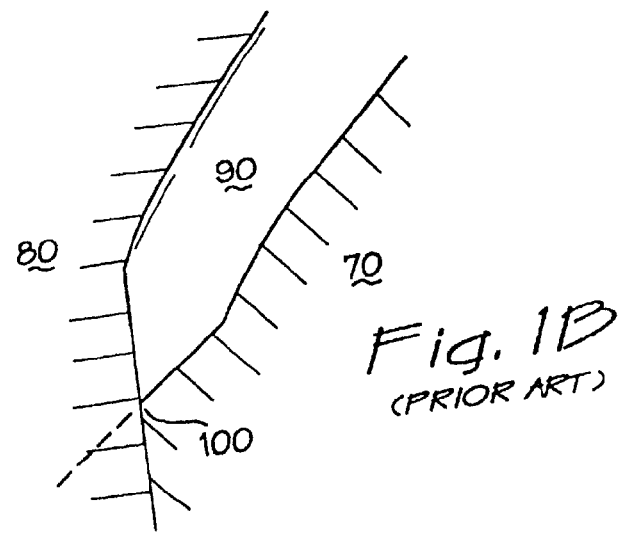
Figure 2A:
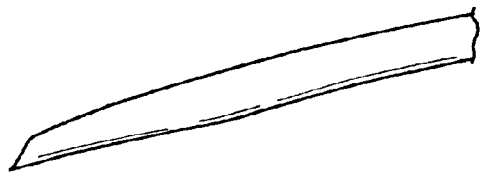
FIGS. 2A–2D are cross sectional views of examples of fully cast molded contact lenses manufactured using conventional molding techniques.
Figure 2B:
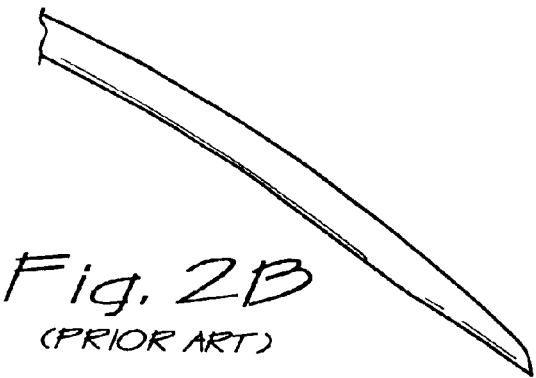
Figure 2C:
Figure 2D:

Another example of such a conventional arrangement is shown in FIG. 1B, with back surface mold section 70 and front mold section 80 forming cavity 90, and point 100 defining the lens periphery.

It can therefore be seen that conventional molding techniques produce a lens with a lens edge form which is "chiselled", or "pointed". Typical lens profiles formed by conventional cast molding techniques are shown in FIGS. 2A, 2B, 2C and 2D.

Figure 3:
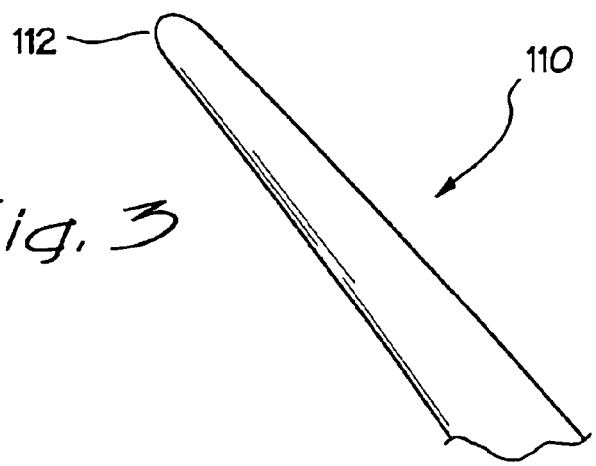
FIG. 3 is a cross sectional view of a fully cast molded contact lens manufactured using a method of the present invention, the contact lens having a substantially smooth, rounded edge profile.

In contrast, as will now be described, the methods of the present invention produce a substantially smooth, rounded edge profile. A contact lens 110 formed by a method in accordance with the present invention is shown in FIG. 3.

Importantly, the illustrated lens 110 is produced in the fully molded state, without post molding steps designed to alter the shape or configuration of the peripheral edge. As shown, the lens 110 produced by a method in accordance with the present invention has a rounded, smooth edge 112.

Although the lens 110 may have seen some of the processing steps conventionally associated with a lens of this type, for example, demolding, hydration, inspection, packaging and sterilization, the lens 110 edge profile has not been substantially altered from its original, molded shape.

The illustrated lens 110 is produced by modification to insert tooling which is conventionally used to create the casting cups (i.e. mold halves) that are used to cast mold the lens.

As is well known in the art, prior to the cast molding of the contact lens, each of the mold sections (such as back surface mold 20 and front surface mold 30 in FIG. 1), is formed by injection molding a resin in the cavity of an injection molding apparatus. Mounted in the injection molding apparatus are "tools" (hereinafter sometimes referred to as "tooling inserts") for forming the optical surface impressions on the mold sections. Whereas the mold sections are typically used only once for casting an individual lens, the injection molding tools are used to make hundreds of mold sections (i.e. mold halves).

The tools used to make the mold sections are manufactured to extremely high specifications. No roughness or other surface defects are acceptable on a tool as such defects would be transferred to all of the mold sections made therefrom. Any such defect on the mold section surface would be transferred to the molded contact lens. The tools are typically made from brass, stainless steel, nickel or some combination thereof.

Figure 4A:
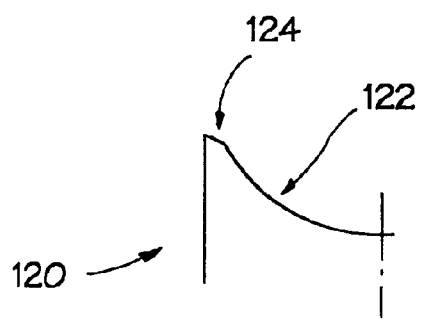
FIGS. 4A and 4B are sectional and front views of a conventional tooling insert used in conventional contact lens manufacturing techniques to form a mold section used for cast molding a contact lens.
Figure 4B:
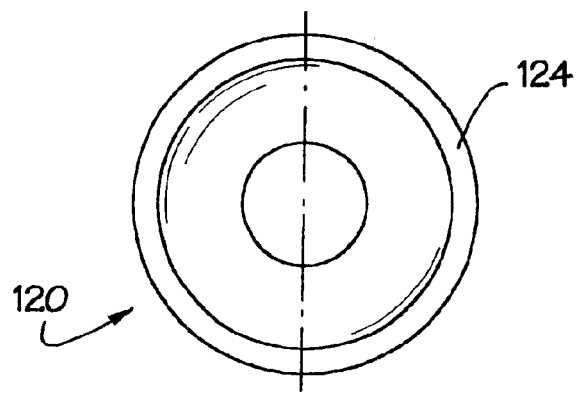

Turning now to FIGS. 4A and 4B, a conventionally manufactured tool 120 is shown.

Typically, for making the back surface mold (such as mold half 20 shown in FIG. 1A), the tool 120 includes at least one base curve (represented by line 122), to provide fit and/or refractive correction, the correction being, for example, spherical, torodial, multifocal, bifocal, etc. In addition, the tool 120 includes a feature 124 which forms part of the lens edge geometry. Feature 124 is sometimes tapered. The edge tapering on the back surface tool is conventionally flat or concave, in order to achieve a taper on the edge of the molded lens.

In other conventional tools (not shown) the edge feature 124 is omitted from the tool and the base curve is run out to the lens periphery. For example, the back surface tool may have no defined edge feature other than the base curve itself. In this case, edge tapering of the molded lens is usually accomplished by the surface profile of the front surface mold tool which includes a tapered edge feature.

Figure 5:
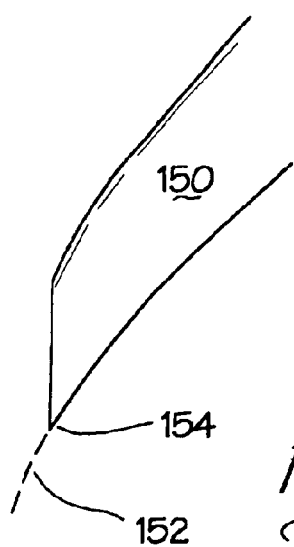
FIG. 5 is a cross sectional view of a fully cast molded contact lens manufactured using another conventional molding technique.

FIG. 5 shows a cross sectional view of a lens 150 produced in this manner, i.e. in which base curve (represented in part by phantom line 152) is run out to the lens periphery 154 and no edge feature has been provided on the back surface tool (not shown). As can be seen, the lens edge geometry that this technique yields is also pointed, such as the lenses shown in FIGS. 2A–2D.

It will be appreciated by those skilled in the art that at sufficiently high magnification, the sharp, angular corners of the lenses shown in FIGS. 2A–2D and FIG. 5 may well be slightly curved or radiused, due to shrinking in the mold for example, and therefore the molded lenses may not precisely duplicate the tooling insert geometry. However, the edge profile of the fully molded lenses shown are sharp and angular, and moreover, do not represent a more desirable, rounded profile that have been only conventionally available only in machined lenses or cast molded lenses which have undergone post processing polishing to alter, e.g., round, the peripheral edge of the lens.

As is described elsewhere herein, a method for cast molding a contact lens in accordance with the present invention generally comprises the steps of providing a back surface tool having a surface corresponding to a desired contact lens surface and at least one convex curve along an outer radius thereof, positioning the tool in a molding apparatus, for example, a conventional injection molding apparatus, introducing a moldable material into the molding apparatus and subjecting the material to conditions, for example, chosen from conditions conventionally used, effective to form a first mold section having a negative impression of the surface of the tool, assembling the first mold section with a second mold section to form a lens shaped cavity therebetween, and forming a contact lens member having a rounded edge form in the lens shaped cavity of the assembled mold sections. Upon demolding, the contact lens member itself is the contact lens product, or can be subjected to hydration to provide the contact lens product.

Figure 6:
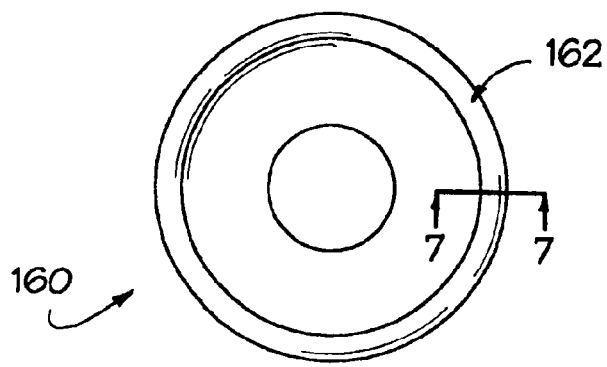
FIG. 6 is a front view of a tooling insert used in a method of the present invention to form a mold section used for cast molding a contact lens with a substantially smooth, rounded edge.
Figure 7:
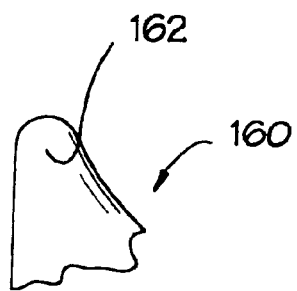
FIG. 7. is a cross sectional view of the insert of the present invention, taken along line 7—7 of FIG. 6.
Figure 8:
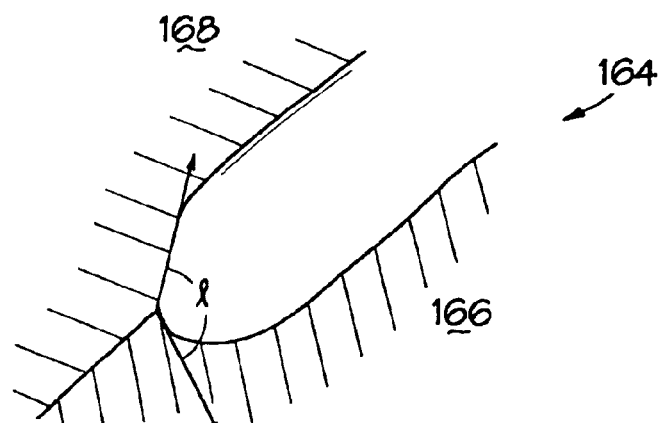
FIG. 8 is a cross sectional view of molding apparatus for forming a rounded edge contact lens in accordance with a method of the present invention.

More particularly, referring now to FIGS. 6–8, in contrast to the conventionally cast molded lenses, the present invention purposefully places at least one convex radius, or curve, at the outer or peripheral edge of a back surface tooling insert. This convex radius can be generated by a series of flats, for example, very short flats which together closely simulate continuously curved convex shaping, or by a combination of flats and convex curves, on the tooling insert.

Referring now specifically to FIGS. 6 and 7, in one embodiment of the present invention, a tooling insert 160 is provided. The tooling insert 160 having such convex shaping as generally described hereinabove. For the lens 110 manufactured in accordance with the present invention and shown in FIG. 3, the tool 160 used in the manufacture of the lens 110 includes a convex curve along its outer radius, or peripheral edge surface 162.

Unlike prior tooling inserts that have been used in the manufacture of conventionally cast molded lenses, the present invention provides a method for manufacturing a contact lens having a cast molded, convex curved radius at the lens edge periphery.

Referring now as well to FIG. 8, a portion of an assembled casting cup pair 164 for fully cast molding a rounded edge contact lens in accordance with the present invention is shown. The cup pair 164 comprises a first, back surface mold half 166 assembled with a second, front surface mold half 168. The convex outer radius of the tool 160 used to make the back surface mold half 166 may be about 0.05 mm radius or larger.

When the mold halves 166, 168 are assembled together, the final fully cast molded lens, such as lens 110, has a substantially smooth, rounded edge as shown. Using a convex curve on the portion of the back surface tool 160 that creates the lens periphery can be used to yield a lens with a much more rounded shape, such as seen in the lens 110 of FIG. 3.

Preferably, when the two mold halves 166, 168 are assembled, the angle of intersection (represented by symbol a in FIG. 8) of the molds 166, 168, on the lens side, is greater than about 100 degrees. In the case of the lens 110 shown in FIG. 3 the angle of intersection of the two mold halves, on the lens side, is 140 degrees on the unprocessed or unhydrated lens member, in the dry state, producing a final or hydrated contact lens 110 with a much more rounded or less clearly defined edge surface. It is to be appreciated that the angle of intersection of the two mold halves on the lens side could be made less than or greater than about 140 degrees, for example, angles greater than 100 degrees could be used, for example, in the range of about 100 degrees to about 170 degrees or more.

After assembling the mold halves 166, 168, the rounded edged contact lens can be cast molded using conventional steps as known to those skilled in the art and described hereinabove. Although it is appreciated that processing steps performed after the cast molding, for example hydration, in the case of a hydrogel hydrophilic lenses, may to some extent change the finished lens manufactured in accordance with the present invention, the peripheral edge form of the finished lens remains substantially unaltered and much smoother than the conventional 'chiseled' edge previously seen.

By implementation of the present invention, a fully cast molded lens can be created with the desired (rounded) edge, without the need for dedicated post formation polishing and machining steps to create the desired peripheral edge form.

Although there has been hereinabove described specific methods of manufacturing a rounded edge contact lens having a rounded peripheral edge surface or form, in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A contact lens sized and adapted for placement on a cornea of an eye, the contact lens comprising:
   a lens body comprising a hydrophilic silicone-containing material having an anterior face, a posterior face having a rounded outer peripheral edge surface extending from the anterior face to the posterior face, the lens body formed by a process including cast molding using a first polymeric mold section having a surface in a general shape of a negative of the posterior face and a concave outer peripheral surface, and a second polymeric mold section having a surface in a general shape of a negative of the anterior face, the contact lens providing enhanced lens wearer comfort relative to an identical contact lens without the rounded outer peripheral edge surface.

2. The contact lens of claim 1 which provides enhanced scleral safety relative to an identical contact lens without the rounded outer peripheral edge surface.

3. The contact lens of claim 1 wherein the contact lens provides enhanced lens wearer comfort relative to an identical contact lens with a pointed outer peripheral edge surface.

4. The contact lens of claim 2 wherein the contact lens provides enhanced scleral safety relative to an identical contact lens with a pointed outer peripheral edge surface.

5. The contact lens of claim 1 wherein the lens body is subjected to no post-formation processing to alter the rounded configuration of the outer peripheral edge surface.

6. The contact lens of claim 1 which provides a refractive correction selected from the group consisting of a spherical correction, a toroidal correction, and a multifocal correction.

7. A contact lens sized and adapted for placement on a cornea of an eye, the contact lens comprising:
   a lens body comprising a hydrophilic silicone-containing material having an anterior face, a posterior face having a rounded outer peripheral edge surface extending from the anterior face to the posterior face, the lens body formed by a process including cast molding using a first polymeric mold section having a surface in a general shape of a negative of the posterior face and a concave outer peripheral surface, and a second polymeric mold section having a surface in a general shape of a negative of the anterior face, the contact lens providing enhanced scleral safety relative to an identical contact lens without the rounded outer peripheral edge surface.

8. The contact lens of claim 7 wherein the contact lens provides enhanced scleral safety relative to an identical contact lens with a pointed outer peripheral edge surface.

9. The contact lens of claim 7 wherein the lens body is subjected to no post-formation processing to alter the rounded configuration of the outer peripheral edge surface.

10. The contact lens of claim 7 which provides a refractive correction selected from the group consisting of a spherical correction, a toroidal correction, and a multifocal correction.

11. A contact lens sized and adapted for placement on a cornea of an eye, the contact lens comprising:
    a lens body comprising a material with a modulus about equal to or greater than the modulus of a hydrophilic, silicone-containing material, the lens body having an anterior face, a posterior face having a rounded outer peripheral edge surface extending from the anterior face to the posterior face, the lens body formed by a process including cast molding using a first polymeric mold section having a surface in a general shape of a negative of the posterior face and a concave outer peripheral surface, and a second polymeric mold section having a surface in a general shape of a negative of the anterior face, the contact lens providing enhanced lens user comfort relative to an identical contact lens without the rounded outer peripheral edge surface.

12. The contact lens of claim 11 which provides enhanced scleral safety relative to an identical contact lens without the rounded outer peripheral edge surface.

13. The contact lens of claim 11 wherein the contact lens provides enhanced lens wearer comfort relative to an identical contact lens with a pointed outer peripheral edge surface.

14. The contact lens of claim 12 wherein the contact lens provides enhanced scleral safety relative to an identical contact lens with a pointed outer peripheral edge surface.

15. The contact lens of claim 11 wherein the lens body is subjected to no post-formation processing to alter the rounded configuration of the outer peripheral edge surface.

16. The contact lens of claim 11 wherein the lens body comprises a material selected from the group consisting of hydrogel-forming polymeric materials and mixtures thereof.

17. The contact lens of claim 11 which provides a refractive correction selected from the group consisting of a spherical correction, a toroidal correction, and a multifocal correction.

18. The contact lens of claim 11 wherein the lens body comprises a material with an oxygen permeability about equal to or greater than the oxygen permeability of a hydrophilic, silicone-containing material.

* * * * *